US011468793B2

(12) United States Patent
Harel et al.

(10) Patent No.: US 11,468,793 B2
(45) Date of Patent: Oct. 11, 2022

(54) AIRWAY MANAGEMENT VIRTUAL REALITY TRAINING

(71) Applicant: Simbionix Ltd., Airport City (IL)

(72) Inventors: Amnon Harel, Binyamina (IL); Niv Fisher, Ramat Gan (IL); Kostya Sydoruk, Airport City (IL); Leonid Notkin, Airport City (IL); Yishaiya Garfinkel, Airport City (IL)

(73) Assignee: SIMBIONIX LTD., Airport City (IL)

( * ) Notice: Subject to any disclaimer, the term of this patent is extended or adjusted under 35 U.S.C. 154(b) by 0 days.

(21) Appl. No.: 17/174,430

(22) Filed: Feb. 12, 2021

(65) Prior Publication Data

US 2021/0256874 A1    Aug. 19, 2021

Related U.S. Application Data

(60) Provisional application No. 62/976,587, filed on Feb. 14, 2020.

(51) Int. Cl.
*G09B 23/30* (2006.01)
*G06F 3/01* (2006.01)

(52) U.S. Cl.
CPC .............. *G09B 23/30* (2013.01); *G06F 3/011* (2013.01)

(58) Field of Classification Search
CPC ........ G09B 23/30; G09B 23/32; G09B 23/34; G09B 23/283; G09B 23/285; G09B 23/286; G09B 23/288
See application file for complete search history.

(56) References Cited

U.S. PATENT DOCUMENTS

| 6,113,395 A | 9/2000 | Hon |
| 9,251,721 B2 | 2/2016 | Lampotang et al. |

(Continued)

FOREIGN PATENT DOCUMENTS

| EP | 2957991 | 12/2015 |
| KR | 20190087912 A | 7/2019 |

(Continued)

OTHER PUBLICATIONS

Knudsen, et al., "A Randomized, Controlled, Prospective Study Validating the Acquisition of Percutaneous Renal Collecting System Access Skills Using a Computer Based Hybrid Virtual Reality Surgical Simulator: Phase 1", The Journal of Urology, Nov. 2006, vol. 176, pp. 2173-2178.

(Continued)

*Primary Examiner* — Robert J Utama
(74) *Attorney, Agent, or Firm* — Pearl Cohen Zedek Latzer Baratz LLP (57) ABSTRACT

Airway management virtual reality (VR) training systems and methods are provided, which use relatively simple and passive physical patient models to train users in performing airway management procedures. Patient models may include a respiratory tract, a moveable head and an openable jaw, which are anatomically realistic; and electromagnetic sensors that measure the movements of parts of the physical model and movement of tools used to handle the model. The parameters of the medical procedure being performed are sensed, tracked and displayed, providing the trainee with a continuous, detailed and coherent VR representation of the training situation in a realistic scene, utilizing and modifying a sensors' hierarchy to focus the VR representation on key features of the training and to yield interactivity of the VR patient and assessment of the trainee's performance.

11 Claims, 9 Drawing Sheets

(56) References Cited

U.S. PATENT DOCUMENTS

| | | | |
|---|---|---|---|
| 9,501,955 B2 | 11/2016 | Chosack et al. | |
| 9,626,805 B2 | 4/2017 | Lampotang et al. | |
| 10,460,625 B2 | 10/2019 | Tessier et al. | |
| 2002/0163497 A1 | 11/2002 | Cunningham et al. | |
| 2008/0227073 A1* | 9/2008 | Bardsley | G09B 23/34 434/267 |
| 2008/0294010 A1* | 11/2008 | Cooper | A61B 1/267 600/199 |
| 2009/0177452 A1 | 7/2009 | Ullrich et al. | |
| 2009/0263775 A1 | 10/2009 | Ullrich | |
| 2010/0167250 A1 | 7/2010 | Ryan et al. | |
| 2010/0167253 A1 | 7/2010 | Ryan et al. | |
| 2010/0178644 A1 | 7/2010 | Meglan et al. | |
| 2010/0248200 A1 | 9/2010 | Ladak et al. | |
| 2011/0238079 A1 | 9/2011 | Hannaford et al. | |
| 2011/0284004 A1* | 11/2011 | Silver | A61M 16/06 128/205.13 |
| 2012/0280988 A1 | 11/2012 | Lampotang et al. | |
| 2013/0041292 A1 | 2/2013 | Cunningham | |
| 2013/0189663 A1 | 7/2013 | Tuchschmid et al. | |
| 2013/0230837 A1 | 9/2013 | Meglan et al. | |
| 2013/0323700 A1 | 12/2013 | Samosky et al. | |
| 2014/0099617 A1 | 4/2014 | Tallman, Jr. | |
| 2014/0272834 A1 | 9/2014 | Washburn et al. | |
| 2014/0272863 A1 | 9/2014 | Kim | |
| 2015/0079565 A1* | 3/2015 | Miller | G09B 23/28 434/252 |
| 2016/0026253 A1 | 1/2016 | Bradski et al. | |
| 2016/0147308 A1 | 5/2016 | Gelman et al. | |
| 2016/0262608 A1 | 9/2016 | Krueger | |
| 2017/0105614 A1* | 4/2017 | McWilliam | A61M 16/0488 |
| 2017/0221387 A1 | 8/2017 | Lampotang et al. | |
| 2017/0229044 A1 | 8/2017 | Benson et al. | |
| 2017/0372640 A1 | 12/2017 | Lampotang et al. | |
| 2018/0293802 A1* | 10/2018 | Hendricks | G09B 23/30 |
| 2018/0303558 A1 | 10/2018 | Thomas | |
| 2018/0333548 A1* | 11/2018 | Nadkarni | A61M 16/0051 |
| 2019/0019434 A1* | 1/2019 | Hastings | G16H 50/50 |
| 2019/0057620 A1 | 2/2019 | Eggert et al. | |
| 2019/0282324 A1* | 9/2019 | Freeman | G09B 23/288 |
| 2019/0380780 A1 | 12/2019 | Sela et al. | |
| 2020/0020171 A1 | 1/2020 | Hendricks et al. | |

FOREIGN PATENT DOCUMENTS

| | | |
|---|---|---|
| WO | WO 01/88882 | 11/2001 |
| WO | WO 2016/040376 A1 | 3/2016 |

OTHER PUBLICATIONS

Wignall, et al., "Surgical Simulation: A Urological Perspective", The Journal of Urology, May 2008, vol. 179, pp. 1690-1699.

* cited by examiner

AIRWAY MANAGEMENT VIRTUAL REALITY TRAINING

PRIOR APPLICATION DATA

The present application claims benefit from prior provisional patent application No. 62/976,587, filed Feb. 14, 2020, entitled AIRWAY MANAGEMENT VIRTUAL REALITY TRAINING, incorporated herein by reference in its entirety.

BACKGROUND OF THE INVENTION

Technical Field

The present invention relates to the field of virtual reality systems for medical training, and more particularly, to airway management training systems.

Background

Prior art airway management training systems utilize mechanically complex patient models that include multiple motors and associated actuators and complex model structural features to make the patient model as realistic as possible.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an airway management training system comprising: a physical and typically passive patient model having a respiratory tract, a head that is movable from side to side and an openable jaw, a plurality of electromagnetic sensors configured to measure relative positions of the head and the jaw and relative positions of at least one airway management tool with respect to the respiratory tract, and a virtual reality (VR) system configured to provide a user or other trainee with a VR representation of a scene, of at least a patient corresponding to the physical patient model, of the at least one airway management tool and of hands of the trainee that manipulate or handle the at least one airway management tool.

One aspect of the present invention provides an airway management training method comprising: training airway management within a virtual reality (VR) environment, using a physical patient model and at least one airway management tool to enhance the VR environment, wherein the physical patient model has a respiratory tract, a head that is movable from side to side and an openable jaw, and the at least one airway management tool has at least one pressure sensor, measuring relative positions of the head and the jaw and relative positions of the at least one airway management tool with respect to the respiratory tract, using a plurality of electromagnetic sensors associated with the passive patient model, and displaying to a trainee, in the VR environment, a scene, a patient corresponding to the physical patient model, the at least one airway management toot and hands of the trainee.

These, additional, and/or other aspects and/or advantages of the present invention are set forth in the detailed description which follows; possibly inferable from the detailed description; and/or learnable by practice of the present invention.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical methods and mechanisms for virtual reality training of airway management and thereby provide improvements to the technological field of medical simulators. Specifically, airway management virtual reality training systems are provided, which use relatively simple and passive physical patient models to train users (e.g. trainees) in performing airway management procedures. Patient models include a modeled respiratory tract, a head that is movable from side to side with respect to a torso, and an openable jaw, which are anatomically realistic. The physical patient models include electromagnetic sensors that provide the system data concerning the movements of pails of the model and concerning movement of tools into, within and out of the model.

The user or trainee may manipulate airway management tools, such as a laryngoscope, a manual resuscitator and other tools to perform airway management procedures, while pressure sensors on the tools provide input concerning the mechanical interactions of the airway management tools with parts of the physical patient model. The tools may be real tools, tool models or multipurpose elements that are simulated as specific tools within the virtual reality (VR). Both model and tools may have trackers that provide the positional and orientational data to the system. In addition, the system has multiple VR sensors, e.g., cameras, to monitor the airway management procedures that are being carried out by the trainee.

Systems may track and sense many parameters of the medical procedure being performed and use them to provide the trainee with a continuous, detailed and coherent virtual reality representation and display of the training situation in a realistic scene, utilizing and modifying a sensors' hierarchy to focus the representation on key features of the training and to yield interactivity of the VR-simulated patient model and assessment of the trainee's performance.

While the patient some embodiments model is simple and passive compared to prior art training models, the VR system compensates for its simplicity by a realistic representation and display of the procedures that are being carried out—that is provided to the user (trainee). Systems may be configured to have visual representations that suggest at least some of the tactile input that is provided by more complex prior art models. In particular, the data collected by the system is organized in a hierarchical and situation-related manner, and so provides a continuous and realistic VR representation of the performed procedures, e.g., with respect to the positions and orientations of the airway management tools relative to the modeled respiratory tract, with respect to pressures applied by the airway management tools on the modeled respiratory tract, and with respect to the hands of the trainee that manipulate the tools.

For this purpose, disclosed systems dynamically identify a treatment situation performed by the trainee and dynamically manage the situation-related hierarchy among the sensors—to keep the representation and display continuous and coherent with respect to the identified treatment situation. For example, when the trainee manipulates or handles a manual resuscitator, the system may represent or display the hand of the trainee that is concealed underneath it—according to data from pressure sensors on the resuscitator that is used to complement the visual data collected by the cameras. In another example, a multipurpose (e.g. generic) tool may be used to perform auxiliary actions by the trainee, and be represented and displayed as the corresponding specific real tool (e.g., scalpel, forceps, tubes such as ET (endotracheal) tube, suction, stethoscope, capnometer, oximeter, etc.) only within the VR scene—further simplifying the system. The VR system may simulate various scenes of operation, as well as multiple assistants, with which the interaction of the trainee may be monitored. For example, the cameras may be used to sense the position and posture of the trainee and relate them to instructions given by the trainee to real or virtual helpers. Moreover, hands of the trainee may be represented by the VR system even when outside the sensing range of the cameras—by adjusting the VR representation according to the identified situation, e.g., showing a trainee's hand spread out to receive a (simulated) tool. Embodiments of disclosed systems are illustrated in non-limiting manners in the following figures.

One advantage of the system is the simplicity of the physical model, which makes it cheaper to buy and use as well as robust for training outdoors (e.g., for military doctors). Another advantage is the reliable feedback provided over a wide range of procedures and user actions allowing the trainee to practice diverse airway management procedures in many environmental situations.

Figure 1A:
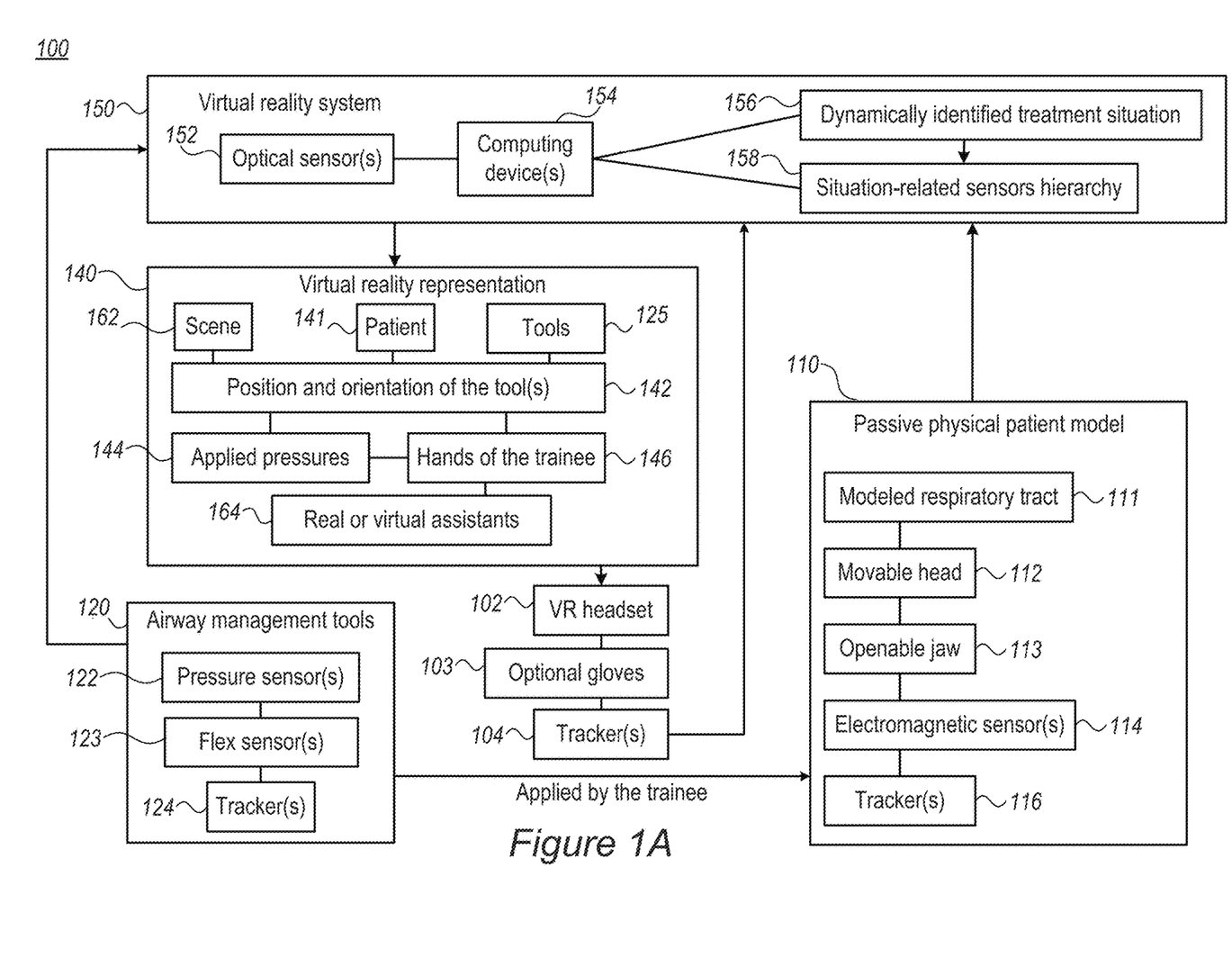
FIGS. 1A and 1B are high-level schematic block diagrams of an airway management training system, according to some embodiments of the invention.
Figure 1B:
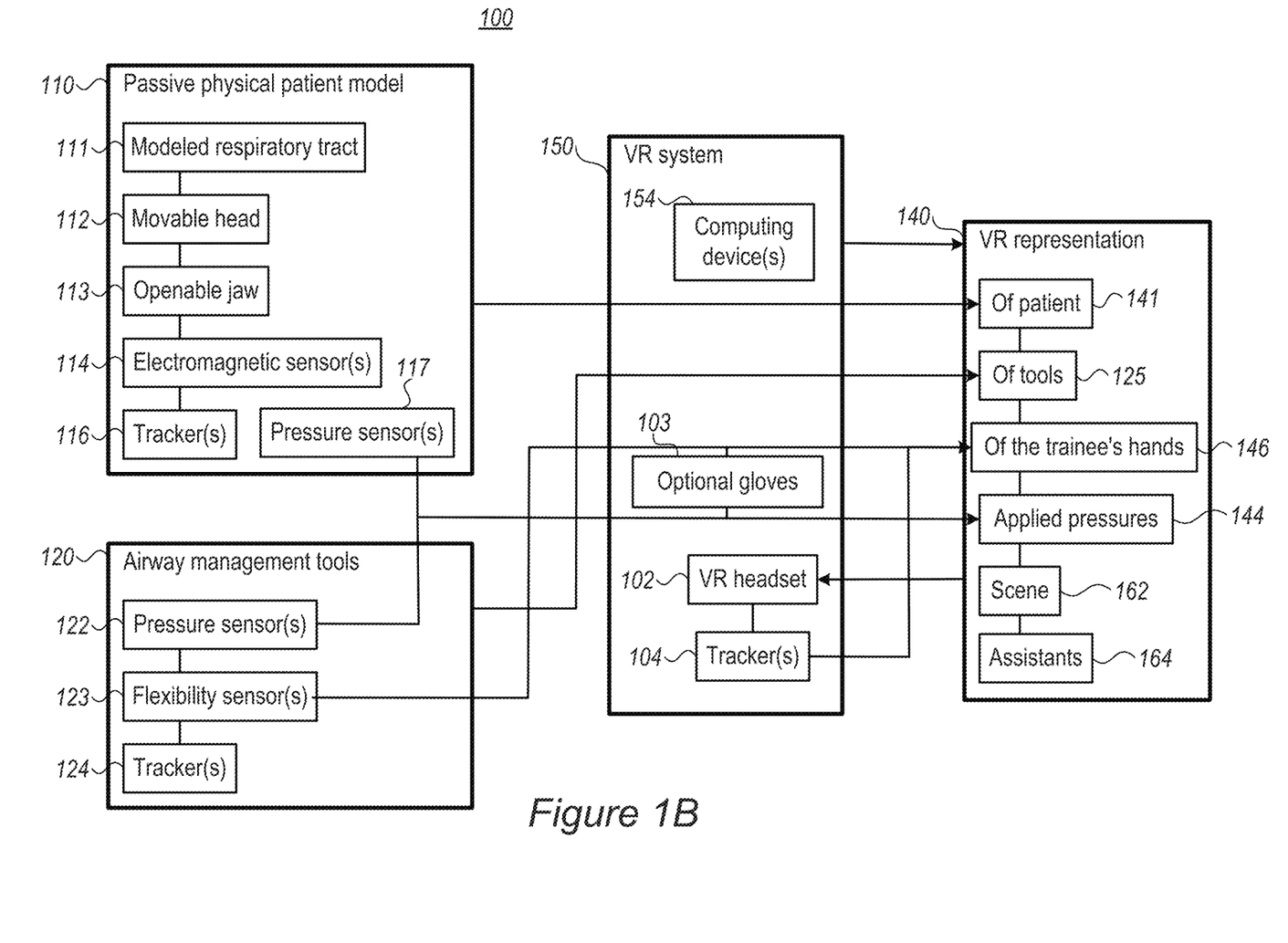
Figure 2:
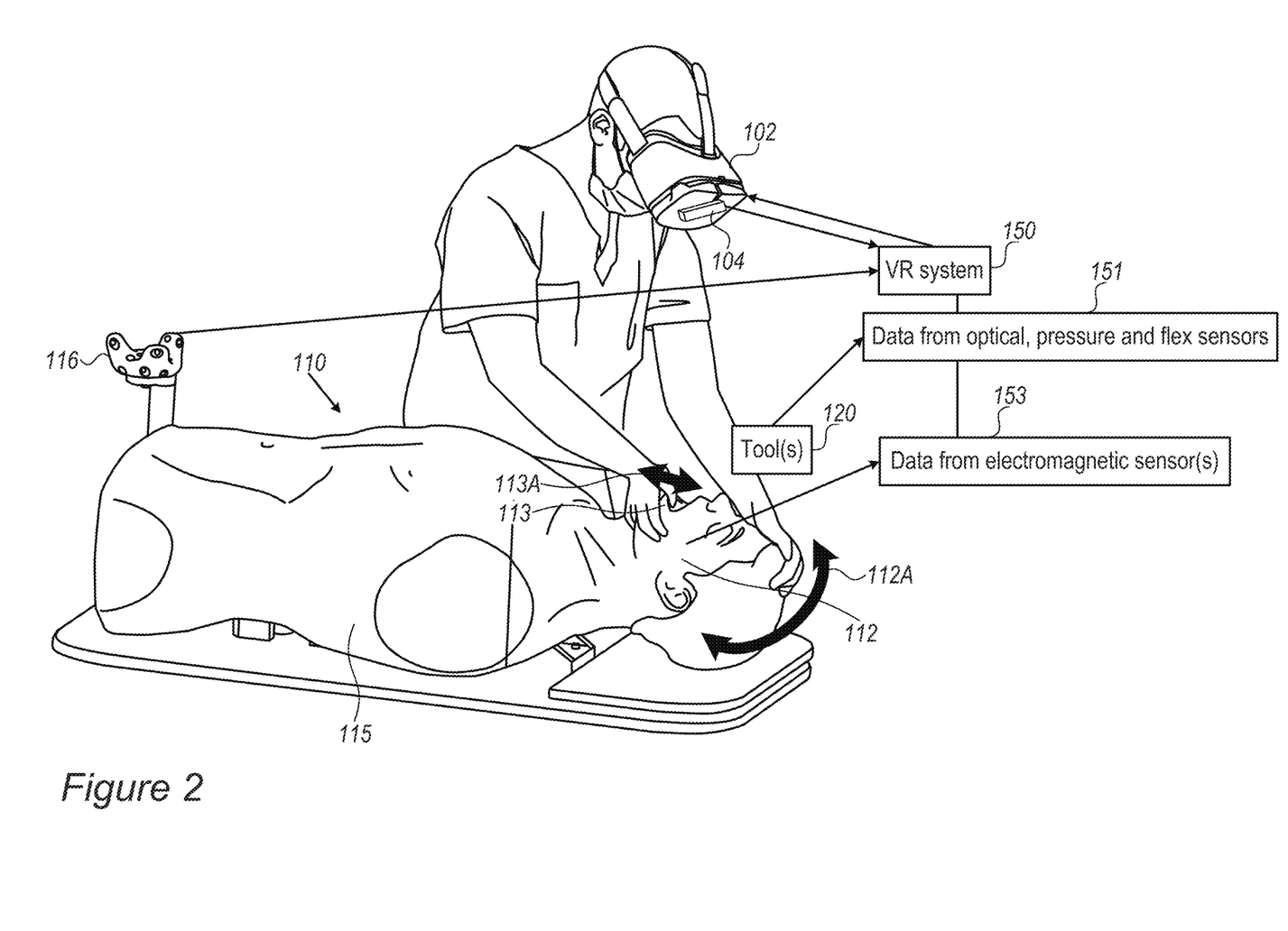
FIGS. 2-4 are high-level schematic illustrations of components of airway management training systems, according to some embodiments of the invention.
Figure 3:
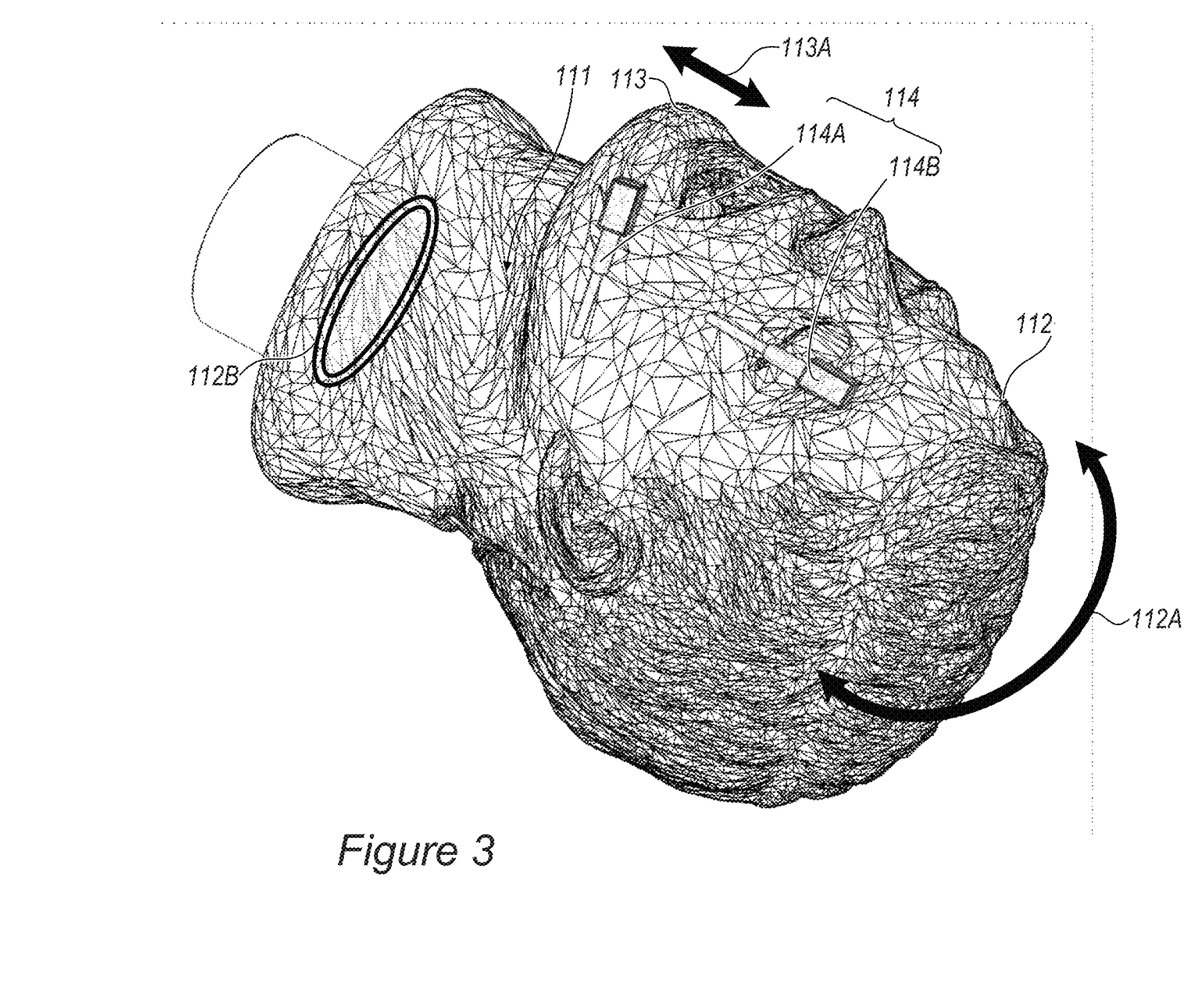
Figure 4:
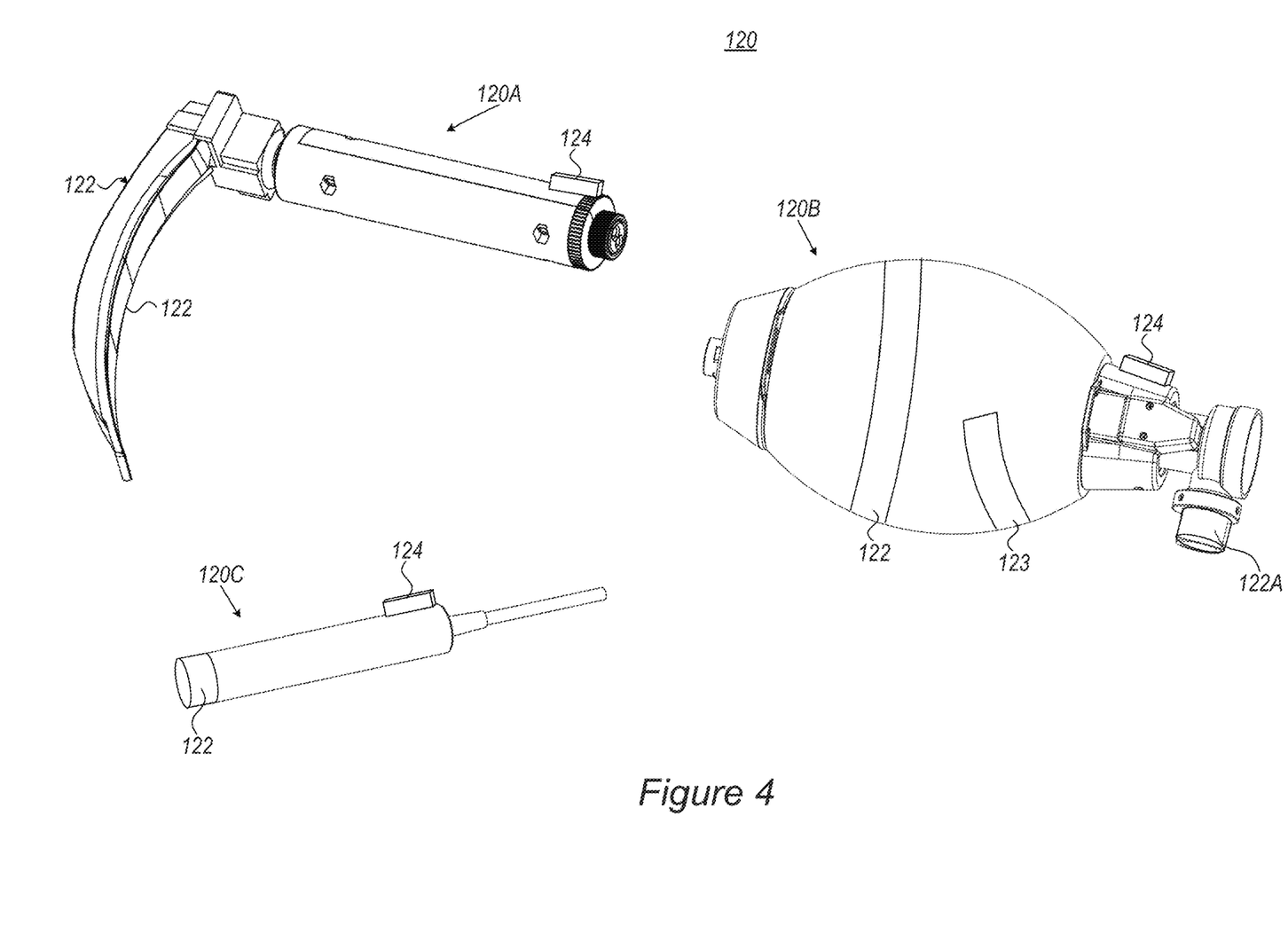

FIGS. 1A and 1B are high-level schematic block diagrams of an airway management training system 100, according to some embodiments of the invention. FIGS. 2-4 are high-level schematic illustrations of components of airway management training system 100, according to some embodiments of the invention. Airway management training systems 100 comprise a virtual reality (VR) system 150 that provides the trainee with a simulated scene 162 and indications related to the trainee's applied airway management procedures upon a passive physical patient model 110 using a variety of real, modeled and/or simulated airway management tools 120.

As illustrated schematically in FIG. 1A, VR system 150 may be configured to dynamically identify treatment situations and respond according to a situation-related hierarchy of the multiple sensors in training system 100—to continuously provide a realistic representation of the airway management procedures applied by the trainee using system 150.

The trainee may use a VR headset 102, to which VR system 150 provides a VR representation 140, possibly including eye trackers (not shown) that provide VR system 150 data concerning the trainee's eye movements. One or more trackers 104 may be attached to VR headset 102 to track the trainee's head. The trainee may further use one or two gloves 103 (see FIGS. 1A and 1B) that may be equipped with additional tracker(s) 104, e.g., on the trainee's hand(s) and/or on the trainee's finger(s)—to track the positions of the hands and fingers of the trainee. Suitable gloves used may include the Manus VR glove or the Noitom Hi5 VR Glove, or other suitable gloves. In certain embodiments, optical sensors 152 such as cameras may also be attached to the trainee's head (or headset 102), hands (or gloves 103) or other body parts to provide close images of the treatment procedures carried out by the trainee. In certain embodiments, one or more gloves 103 may be configured to measure forces applied by the trainee during manipulation of physical model 110 (e.g., as illustrated schematically in FIG. 2) and to deliver the measurements to VR system 150, which may use the measurements as additional sensor data. In certain embodiments, one or more gloves 103 may be configured to provide the trainee with haptic feedback, applying forces to the trainee's hand(s) in addition to forces experienced by manipulating physical model 110, e.g., to enhance the tactile simulation, simulate additional structural features (e.g. in the VR patient's airway) etc.

As illustrated schematically in FIG. 1B, VR system 150 may be configured to represent within the VR environment (140) patient model 110 as VR patient 141, used or generic tools 120 as corresponding VR tools 125, the trainee's hands (and possibly other body parts of the trainee) in VR 146, as well as pressures 144 applied by tools (pressure VR representation may be visual, as an indication, using tactile cues, or by other means), surrounding scene 162, virtual or real assistants 164, medical equipment (not shown), etc. FIG. 2 illustrates schematically the physical training setting, FIG. 3 illustrates schematically some details of the physical structure of patient model 110 and FIG. 4 illustrates schematically some tools 120.

Figure 5A:
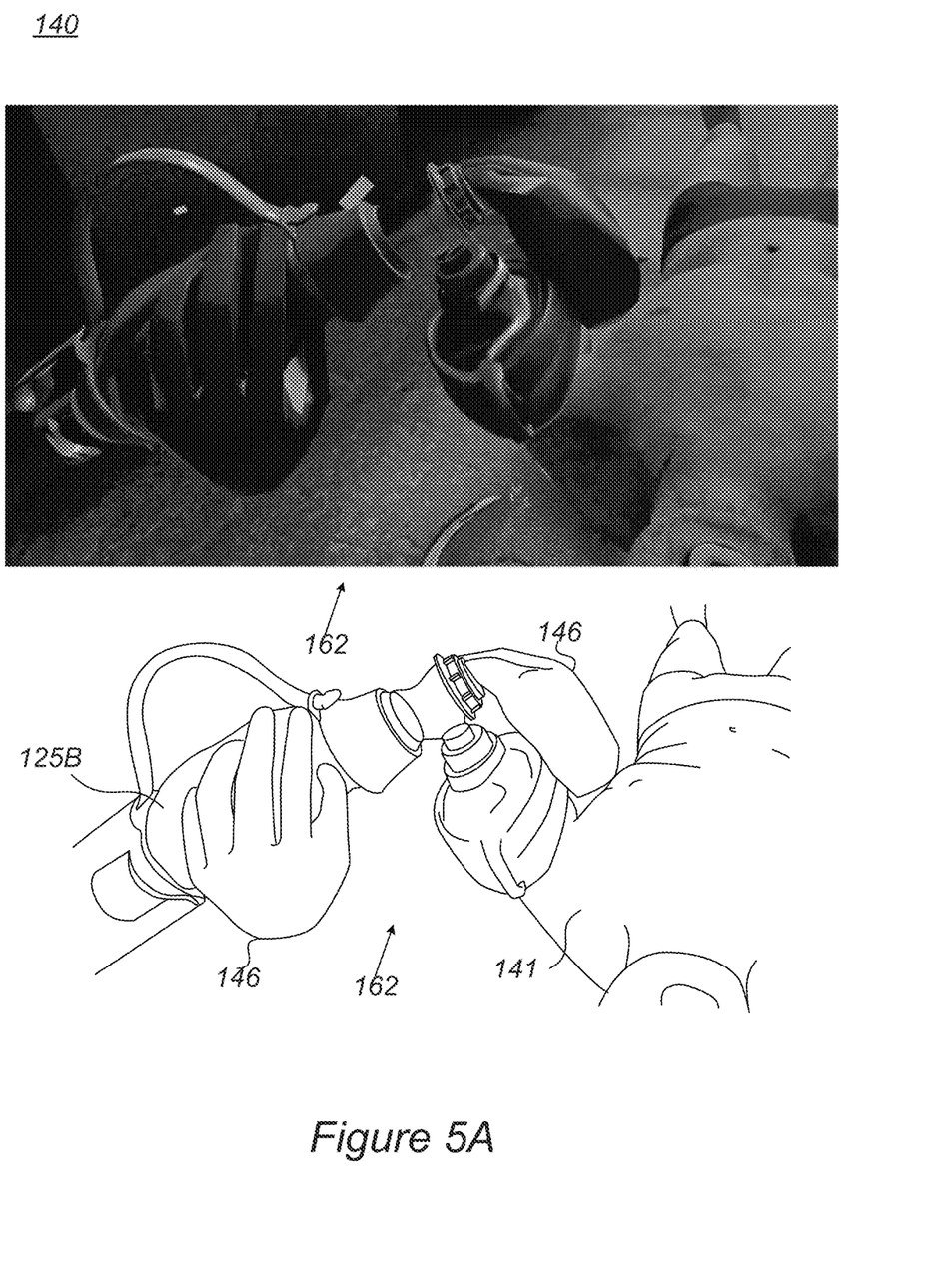
FIGS. 5A and 5B provide examples for VR representations of the scene, patient, tool, and the trainee's hands, according to some embodiments of the invention.
Figure 5B:
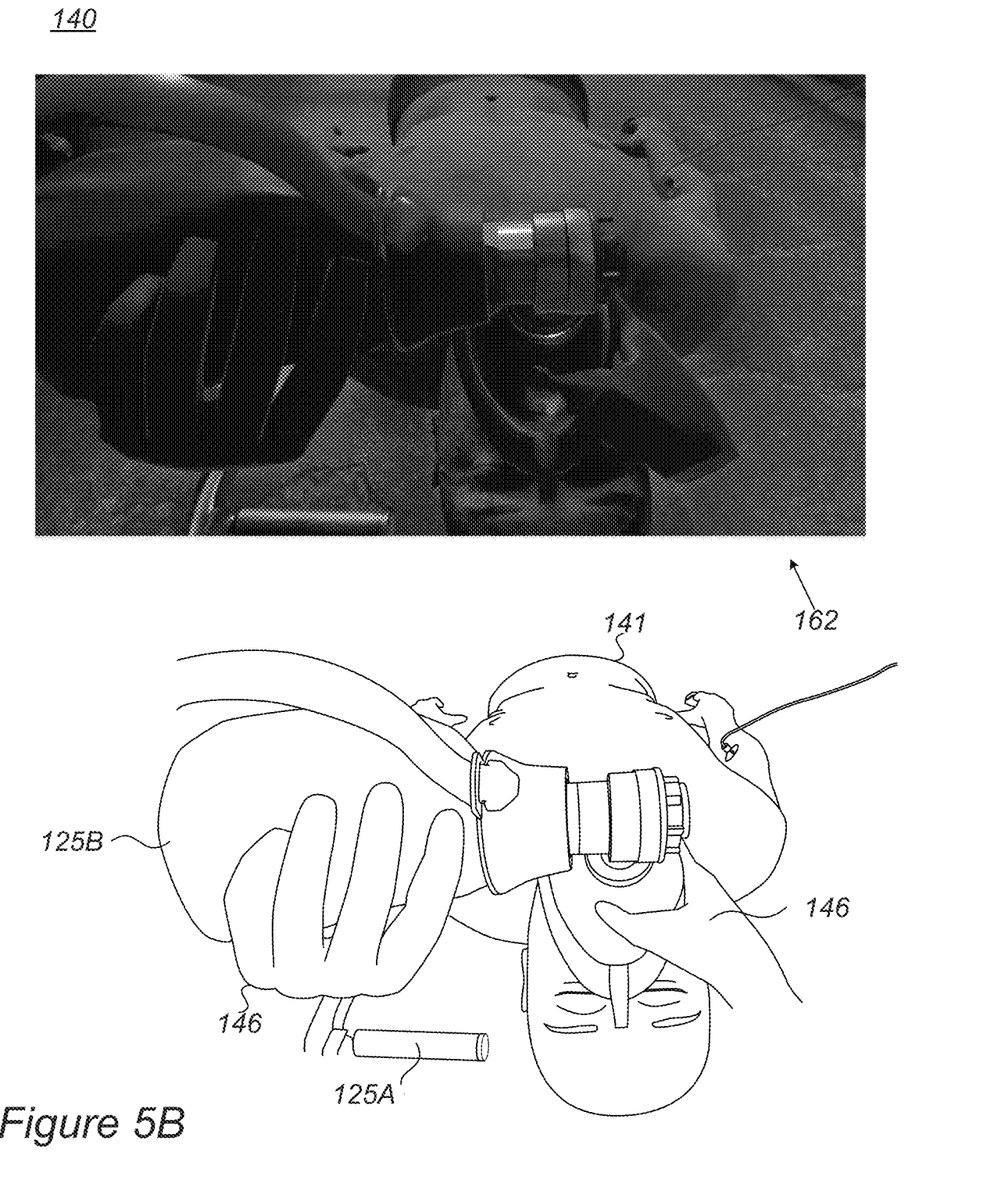

FIGS. 5A and 5B provide examples for VR representations 140 of a scene 162, patient 141, tool representation 125B, 125A (of a manual resuscitator 120B and a laryngoscope 120A, respectively, the latter shown on the edge of FIG. 5B—see further explanations below) and trainee's hands 146, according to some embodiments of the invention. Each of FIGS. 5A and 5B includes an example for actual VR representation 140 and a line drawing that indicates the parts of the representation as listed above. The continuous and coherent matching of VR representation 140 to the trainee's actions on patient model 110 may yield realistic training, effective learning and reliable assessment of the trainee's capabilities.

Airway management raining systems 100 comprise passive physical patient model 110 (e.g., a mannequin or part thereof) having a modeled respiratory tract 111, a head 112, connected to a torso 115, that is movable from side to side and an openable jaw 113, as illustrated, e.g., in FIGS. 2 and 3. The direction of movement of head 112 is illustrated schematically by arrow 112A and the direction of movement of jaw 113 is illustrated schematically by arrow 113A. It is noted that the simplicity of patient model 110 (compared to mechanically complex prior art patient models that include multiple motors and associated actuators, more movement directions and more complex model features) is compensated for by VR systems 150, which replaces at least some of the tactile information in prior art systems with visual information. Advantageously, the simplicity of passive physical patient model 110 allows making it robust and deployable in the field, e.g., to train military doctors and or civilian medical personnel under realistic conditions.

Patient model 110 further comprises one or more electromagnetic sensors 114 configured to measure relative positions of head 112 and jaw 113 and relative positions of airway management tool(s) 120 with respect to modeled respiratory tract 111. For example, electromagnetic sensors 114A, 114B (illustrated schematically in FIG. 3, electromagnetic sensors 114A, 114B are located inside head 112) may be configured to measure the jaw and head movements, respectively, providing data from electromagnetic sensors 153, as illustrated schematically in FIG. 2. FIG. 3 also illustrates the mechanical arrangement 112B (connecting head 112 to torso 115 and supporting rotational movement of head 112) configured to enable the movement of head 112 from side to side (movement 112A illustrated in FIG. 2). Modeled respiratory tract 111 is not shown explicitly, it is modeled however to provide realistic interactions with applied tools 120, which correspond to the respiratory tract anatomy. In certain embodiments, patient model 110 may also include pressure sensors 117 located at specific locations which are important during airway management, to complement pressure sensors 122 on tool(s) 120. Pressure and optionally flex sensors 122, 123, respectively, on tool(s) 120 and optical sensors 152 of VR system 150 (and/or tracker 104 on headset 102) provide data 151 concerning tools 120, which is used by VR system 150 to identify treatment situation 156 performed by the trainee and to dynamically manage situation-related hierarchy 158 of the plurality of sensors in system 100.

Airway management tools 120 may comprise, for example, laryngoscope 120A, manual resuscitator 120B (e.g., Ambu® resuscitator equipment or other resuscitators), a multipurpose tool 120C that may be represented or displayed in the VR as any of a range of tools (e.g., scalpel, forceps, tubes e.g., ET (endotracheal) tube, suction, stethoscope, capnometer, oximeter) etc.—as illustrated schematically in FIG. 4. Airway management tools 120 may comprise one or more pressure sensors 122 and possibly tracker(s) 124 that provide feedback to system 100 concerning physical interactions between tool(s) 120 and patient model 110 and concerning position and orientation 142 of tools 120, respectively, which are usable to evaluate the trainee's performance and/or to enhance or modify VR representation 140 of the procedure, generate reactions, e.g., from the simulated patient, etc.

In various embodiments, laryngoscope 120A may be real or modeled, with pressure sensor(s) 122 along the blade of laryngoscope 120A used to provide feedback concerning the forces applied by laryngoscope 120A on modeled respiratory tract 111 (e.g., on the teeth, jaw, or internal parts of the respiratory tract) as the trainee manipulates or handles laryngoscope 120A. The feedback may be translated to VR indications such as simulated patient injuries or reactions, and/or to assess the quality of the application of the respective airway management procedure by the trainee.

In various embodiments, manual resuscitator 120B may be real or modeled, with pressure sensor(s) 122 and/or flex sensors 123 along at least a part of the circumference of manual resuscitator 120B and/or on a mouthpiece 122A thereof. Pressure sensor(s) 122, 122A may be used to provide feedback concerning the forces applied by manual resuscitator 120B on modeled respiratory tract 111 (e.g., on the teeth or on jaw 113) as the trainee handles manual resuscitator 120B. The feedback may be translated to VR indications such as simulated patient injuries or reactions, and/or to assess the quality of the application of the respective airway management procedure by the trainee. The degree of air-tightness between manual resuscitator 120B and a mouth of patient model 110 may also be measured and indicated in VR representation 140 and/or by modifying the simulated patient reactions in VR representation 140 (e.g., inadequate air-tightness may result in insufficient or no chest movements upon operating manual resuscitator 120B).

Moreover, data from pressure sensor(s) 122 may be used to enhance or modify the VR representation of the trainee, e.g., data from pressure sensor(s) 122 that indicates that a hand of the trainee is below manual resuscitator 120B and not visible to optical sensors 152 of VR system 150—may be used to represent and display hands 146 (in spite of at least one hand being at least partly hidden from view by manual resuscitator 120B) correctly or approximately, to enhance the continuity of VR representation 140 and its realistic feel. For example, VR system 150 may be configured to represent hand 146 of the trainee to correspond with detected pressure applied on and/or flexing of the circumference of manual resuscitator 120B.

In various embodiments, multipurpose tool 120C, which may have a generic design, may be used to adjustably represent or display any of a variety of auxiliary tools such as any of a scalpel, forceps, tubes e.g., ET (endotracheal) tube, suction, stethoscope, capnometer, oximeter, etc. For example, VR system 150 may be configured to provide and display, virtually, tool 120C as any of a scalpel, forceps, ET tube, suction, stethoscope, capnometer, oximeter, etc., according to requests by the trainee (e.g., from real or simulated assistants 164) and/or according to dynamically identified treatment situation 156.

FIGS. 5A and 5B provide examples for VR representations 140 of scene 162, patient 141, tool 125 and trainee's hands 146, according to some embodiments of the invention. Virtual reality (VR) system 150 may be configured to provide a trainee (wearing a VR headset 102, e.g., with an attached tracker 104, illustrated schematically in FIG. 2) with scene 162 comprising at least patient 141 corresponding to physical patient model 110, and representation 140 of the medical procedure performed by the trainee on passive physical patient model 110 using airway management tool(s) 120. VR headset 102 may comprise a head-mounted device that provides VR representation 140 to the trainee, and may comprise display(s) and processor(s), e.g., associated with computing device 154 disclosed below and communicating with VR system 150 over wire or wirelessly. VR headset 102 may comprise a stereoscopic head-mounted display, provide sound, and may further comprise head motion and/or eye tracking sensors, and possibly related and associated controllers. Through VR system 150 and VR headset 102, the trainee may be trained in airway management procedures in the virtual and controlled environment of VR representation 140.

VR representation 140 may comprise tool representations 125 of tool(s) 120, indications of at least position and orientation 142 of airway management tool 120 with respect to modeled respiratory tract 111 (including tool representation 125) (see examples in FIGS. 5A and 5B), representation of pressures 144 (denoted in FIGS. 1A and 1B schematically) applied by airway management tool(s) 120 on modeled respiratory tract 111, and representation of the hands of the trainee 146 that manipulate one airway management tool(s) 120. Position and orientation 142 of tool(s) 120 may be represented visually, as illustrated in the non-limiting examples provided by FIGS. 5A and 5B, e.g., as measured by optical sensors 152 and/or tracker(s) 124. Pressures 144 may be represented, e.g., by indicators and/or by resistance to tool movements.

VR system 150 may comprise optical sensors 152 configured to track at east a location of passive patient model 110 (e.g., using tracker 116 illustrated in FIG. 2), to track airway management tool(s) 120 (e.g., derive the position and orientation thereof) and to track the hands of the trainee. VR system 150 may further be configured to dynamically identify treatment situation 156 performed by the trainee and to dynamically manage situation-related hierarchy 158 among sensors 152, 114, 122—which keeps representation 140 continuous and coherent with respect to the identified treatment situation. VR system 150 is configured to receive data from sensors 114, 122, 123 and trackers 104, 116, 124 over wire and/or wireless.

It is noted that the continuity of VR representation includes continuous movements of the represented elements, lacking any jumps or jerks that do not correspond to real movements. Situation-related sensor hierarchy 158 relates to the relative reliability of the various sensors and may be used to rule out potential discontinuous representation of elements that may be implied by sensors due to their limited field of view, relative distance from the respective elements or less relevant sensing mode—with respect to sensors that are higher in the hierarchy and provide more reliable data.

It is further noted that the coherence of VR representation includes coherent locations of the represented elements, lacking any disappearances or large scale changes that do not correspond to real movements. Situation-related sensor hierarchy 158 relates to the relative reliability of the various sensors and may be used to rule out potential appearance or disappearances of elements in the VR representation of elements that may be implied by sensors due to their limited field of view, relative distance from the respective elements or less relevant sensing mode—with respect to sensors that are higher in the hierarchy and provide more reliable data. For example, in case a hand or part thereof disappears from the field of view of optical sensor 152 as it is hidden beneath manual resuscitator 120B, data from flex sensor 123 thereupon may be used to provide the VR representation of that hand to keep it appearing in an appropriate manner in VR representation 140. Another example concerns instructions given by the trainee, which may be accompanies by hand movements outside of the sensing range. In such cases, the representation of the hands may be complemented by tracker data or by estimated positions.

Specific non-limiting examples for situation-related sensor hierarchy 158 are provided in Table 2 below. As a general rule, for each or some of identified treatment situations 156, VR system 150 may have rules determining which of the sensors and trackers in system 100 are more reliable and which are less reliable, with respect to the geometry of the treatment situation (e.g., potentially hidden elements or elements that may extend beyond the sensing range) and/or with respect to the sensing modality (e.g., in certain situations pressure data may be more reliable than optical data). Situation-related sensor hierarchy 158 may be determined according to such rules for each or some of identified treatment situations 156.

VR system 150 may be configured to generate patient representation 141 from patient model 110 by any of a variety of VR modelling procedures, e.g., using polygon meshes and adding surface features (see, e.g., FIG. 3 for an example of a polygon mesh and FIGS. 5A and 5A for examples of added surface features). It is noted that physical patient model 110 is used as a real world reference for the medical procedures applied by the trainee, and correspond to an internal data model in VR system 150 that is used to construct VR representation 140 of patient 141, displayed to the trainee via VR headset 102. VR system 150 (and/or airway management training system 100) is configured to further augment VR representation 140 with a visual representation of airway management tool(s) 120 according to their position and orientation with respect to modeled respiratory tract 111, a representation and/or indication of pressures 144 applied by airway management tool(s) 120 on modeled respiratory tract 111, and a visual representation of hands 146 of the trainee that manipulate the airway management tool(s).

Table 1 provides a few non-limiting examples for sensors and data in airway management training system 100. The trackers typically have 6DoF—Degrees of Freedom, and may include available trackers with corresponding performance.

TABLE 1

Examples for sensors and data in the airway management training system.

| Tracked elements | Sensors | Derived data |
|---|---|---|
| Physical patient model 110 | Tracker 116 | Position and orientation of the model. |
| Trainee hands, fingers, head, etc. | Tracker 104, e.g., attached to VR headset 102 | 3D tracker data for the trainee and body parts thereof, particularly hands and fingers performing the airway management procedures. |
| Laryngoscope 120A | Tracker 124, Pressure sensor(s) 122 (e.g., on the blade and on the back) | Position and orientation of the tool, pressures applied to its blade and back. With mid-range transmitter and/or possibly using transmitter(s) in model 110. |
| Manual resuscitator 120B (e.g., Ambu ®) | Tracker 124, Pressure and/or flex sensor(s) 122 | Position and orientation of the tool, Measurements of hand-induced squeeze. Gesture identification. |
| Multipurpose, generic tool 120C | Tracker 124 | Position and orientation of the tool, corresponding to the simulated type of tool Possibly with mid-range transmitter. |

Table 2 provides a few non-limiting examples for treatment situations, monitored actions, sensors used and corresponding VR representation and feedback.

TABLE 2

Examples for treatment situations, monitored actions, sensors used and corresponding VR representation and feedback.

| Identified treatment situation 156 | Monitored actions and parameters | Sensors used | VR representation 140, sensor hierarchy 158 and feedback |
|---|---|---|---|
| Preparation for treatment | Instructions delivered by the trainee | Audible, visual, or instructor input | Delays in provision of tools 120 in case of partial instructions |
| Free neck | Neck extension and jaw thrust | Electromagnetic (EM) sensors 114, optical sensors 152 | Priority to EM sensors. Limited visibility if jaw thrust is not performed |
| Intubation | Timely instructions and prior actions | Possibly by simulated assistant 164, or as multipurpose tool 120C | Possibly delays if instructions not received timely. |
| | Performing intubation (if practiced) | EM sensors 114, pressure sensors 122 on multipurpose tool 120C | Visualization of vocal apparatus and tube in the airway |
| Pre-oxygenation | Correct application of manual resuscitator 120B | Pressure sensor(s) 122, 122A detecting air-tightness and air flow | Priority to EM sensors, Visual representation of air delivery to the patient |
| Conscious patient | Detection of vital signs | Optical sensors 152 | Patient moving or breathing, priority to optical sensors 152 |
| Sedation | Detection of patient state, gentle intubation and instructions | Optical sensors 152, EM sensors 114, Audible | Mechanical feedback, priority to optical sensors 152, simulated assistant 164 |
| Application of laryngoscope 120A | Diagnosis, freeing the airway, auxiliary tools, instructions | Optical sensors 152, EM sensors 114, Audible | Visualization of airway, secretions and auxiliary tools (e.g., suction), priority to EM sensors 114 |
| | Proper use of laryngoscope 120A | EM sensors 114, pressure sensors 122 on blade | Visualization of the maneuvers, damage to airway, priority to pressure sensors 122, then EM sensors 114 |
| Surgical procedure | Correct decision and application | Optical sensors 152 | Visualization of multipurpose tool 120C e.g., as a scalpel |

In the following, specific non-limiting examples, related to situations described in Table 2, are provided, for identified treatment situations 156, corresponding virtual patient simulation features that correspond to related indications and/or reactions thereto, expected trainee reactions and sensor hierarchy used to assess the actual trainee reaction.

For example, during preparation for treatment and/or various treatment stages, VR representation 140 may include simulated patient movements, sounds, head movements, various breathing patterns that, are expressed in the head and chest regions and are related to the medical situation, movements of the chests, materials such as fluids in the patient's airway or coming out of it, etc. VR representation 140 may include typical patient behavior according to different patient states, such as alertness, consciousness, partial or full lack of consciousness, suffocation, sedation, various breathing patterns, etc.

VR representation 140 may then be modified in correspondence to the trainee's actions or inactions, such as specific instructions, diagnostical measures such procedures applied to the patient model, measurements and indications taken, use of tools in diagnosis and treatment, etc. Specifically, incorrect or incomplete application of tools to patient model 110 may modify VR representation 140 in a way that reflects the inappropriate application, e.g., incorrect use of manual resuscitator 120B may result in the virtual patient not reacting as expected (e.g., not breathing as expected with respect to chest and head movements and related sounds)—that requires correction by the trainee. It is noted that virtual patient reactions may be represented in VR representation 140 and/or in related medical data and indicators.

Examples for the modification of sensor hierarchy 158 and for the modification of the VR representation of passive patient model 110 with respect to dynamically identified treatment situation 156 include for example the following, relating the sensors listed in Table 1. System 100 may be configured to modify sensor hierarchy 158 and/or the resolution of VR representation 140 according to specific elements in relation to identified treatment situations 156. For example, when the trainee performs fine motoric actions, finger tracker 104 may receive higher priority than other sensors, and the resolution of VR representation 140 in the respective region may be increased. In another example, when the trainee provides instructions and receives tools, the resolution of VR representation 140 may be decreased and sensor priority may be allocated to large scale scene tracking. Additional simulation of virtual assistant may be added to VR representation 140. When the trainee applies manual procedures on modeled respiratory tract 111, head 112, jaw 113—respective electromagnetic sensors 114 may receive priority to influence VR representation 140 of the applied procedures. When the trainee uses tool(s) 120, hand and/or finger tracker 104 may receive priority when the procedures are external and the hands and fingers visible, pressure sensors 122 may receive priority with respect to internal application of tool(s) 120 (e.g., insertion of an ET tube or the laryngoscope's blade), and other sensors such as flex sensor (s) 122 on manual resuscitator 120B may receive priority when application is external but hands are not easily trackable, e.g., when a hand is beneath the resuscitator. Alternatively or complementarily, gesture identification may be used to enhance specific procedures applied by the trainee.

Airway management training systems 100 and virtual reality systems 150 may comprise a computing device 154 or parts thereof such as processor(s) (see, e.g., FIG. 7 below) configured to carry out the disclosed procedures and continuous adjustment of system reactions to the trainee, VR representation 140 and to manage the evaluation of the trainee's actions.

Figure 6:
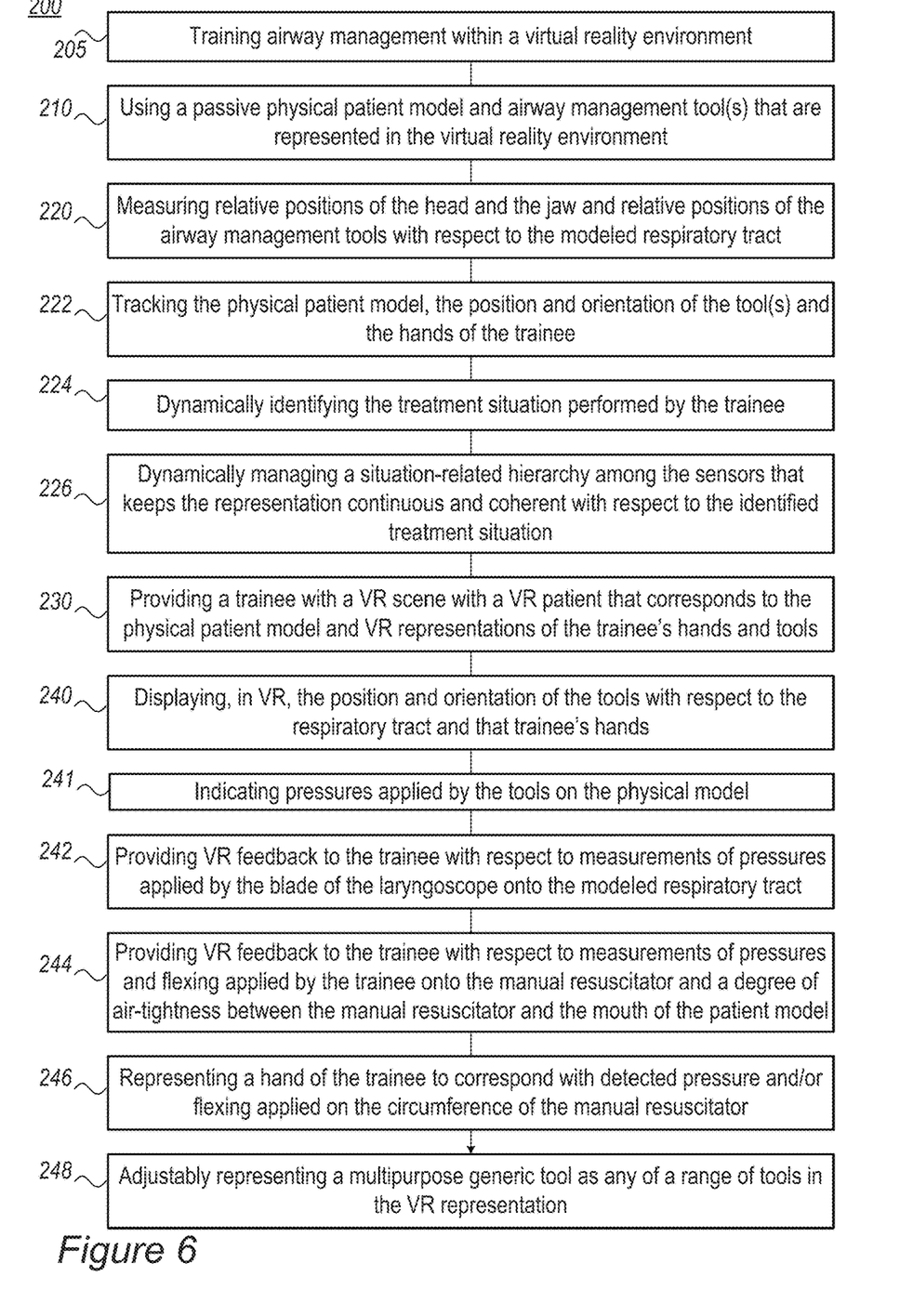
FIG. 6 is a high-level flowchart illustrating airway management training methods, according to some embodiments of the invention.

FIG. 6 is a high-level flowchart illustrating airway management training methods 200, according to some embodiments of the invention. The method stages may be carried out with respect to airway management training systems 100 described above, which may optionally be configured to implement methods 200. Method 200 may be at least partially implemented by at least one computer processor. Certain embodiments comprise computer program products comprising a computer readable storage medium having computer readable program embodied therewith and configured to carry out the relevant stages of method 200 (see, e.g., FIG. 7 below). Method 200 may comprise the following stages, irrespective of their order.

Airway management training methods 200 may comprise training airway management within a virtual reality environment (stage 205), using a passive, physical patient model and at least one airway management tool that are represented in the virtual reality environment (stage 210), wherein the physical patient model has a modeled respiratory tract, a head that is movable from side to side and an openable jaw, and the at least one airway management tool has at least one pressure sensor, measuring relative positions of the head and the jaw and relative positions of the at least one airway management tool with respect to the modeled respiratory tract (stage 220) and providing a trainee with a VR scene in the virtual reality environment, that comprises at least a VR patient corresponding to the physical patient model (using a plurality of electromagnetic sensors associated with the physical patient model), and a VR representation of a medical procedure performed by the trainee on the patient model including at least the at least one airway management tool and the trainee's hands (stage 230). The VR representation may comprise displaying at least a position and an orientation of the at least one airway management tool with respect to the respiratory tract and hands of the trainee that manipulate the at least one airway management tool (stage 240) and indicating pressures applied by the at least one airway management tool on the modeled respiratory tract (stage 241) visually and/or using tactile cues.

Airway management training methods 200 may further comprise tracking at least a location of the physical patient model, tracking the position and orientation of the at least one airway management tool and tracking the hands of the trainee (stage 222).

Airway management training methods 204) may further comprise dynamically identifying a treatment situation performed by the trainee (stage 224) and dynamically managing a situation-related hierarchy among the sensors that keeps the VR representation continuous and coherent with respect to the identified treatment situation (stage 226).

In certain embodiments, the at least one airway management tool comprises a laryngoscope with the at least one pressure sensor being on a blade thereof, and method 200 further comprises providing VR feedback to the trainee with respect to measurements of pressures applied by the blade of the laryngoscope onto the modeled respiratory tract (stage 242).

In certain embodiments, the at least one airway management tool comprises a manual resuscitator with the at least one pressure sensor being on a mouthpiece thereof and at least one pressure and/or flex sensor on at least a part of a circumference thereof, and method 200 further comprises providing VR feedback to the trainee with respect to measurements of pressures applied by the trainee onto the manual resuscitator (and/or flexing of the manual resuscitator by the trainee) and a degree of air-tightness between the manual resuscitator and a mouth of the passive patient model (stage 244).

Airway management training methods 200 may further comprise displaying or representing a hand of the trainee to correspond with detected pressure applied on and/or flexing of the circumference of the manual resuscitator (stage 246).

Airway management training methods 200 may further comprise displaying or representing a multipurpose tool, adjustably, as the at least one airway management tool in the VR representation (stage 248), such as at least one of: a scalpel, forceps, a tube, an ET (endotracheal) tube, suction, stethoscope, capnometer and oximeter.

Figure 7:
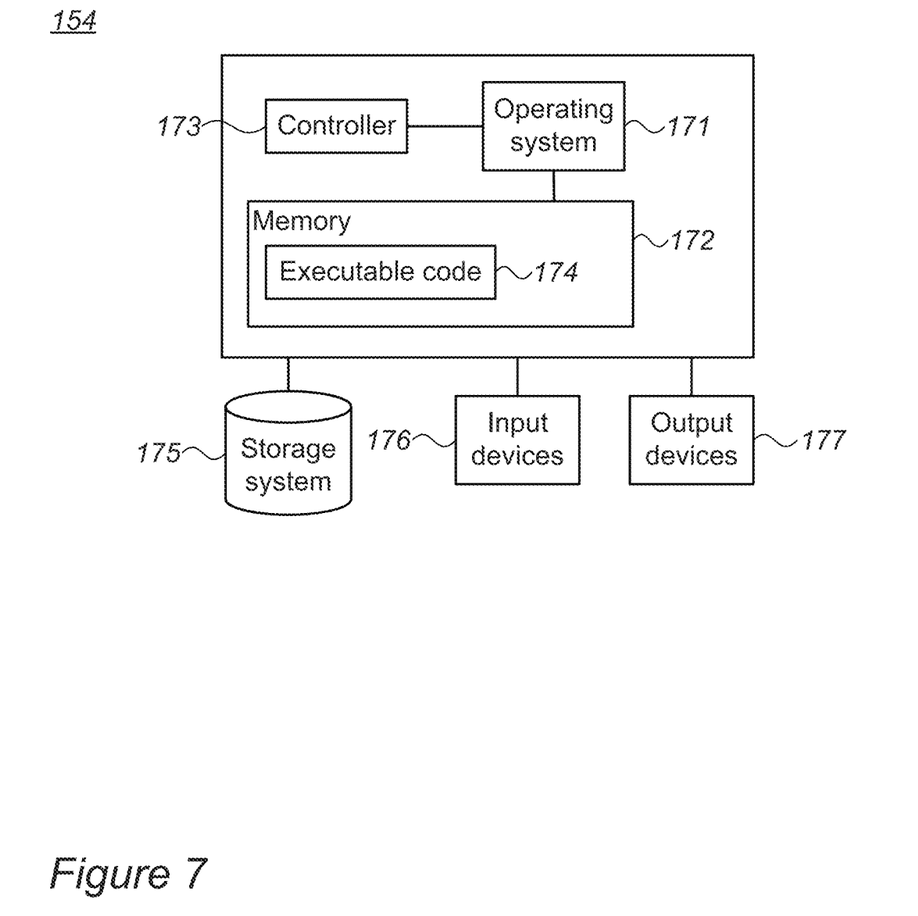
FIG. 7 is a high-level block diagram of an exemplary computing device, which may be used with embodiments of the present invention.

FIG. 7 is a high-level block diagram of exemplary computing device 154, which may be used with embodiments of the present invention. Computing device 154 may include a controller or processor 173 that may be or include, for example, one or more central processing unit processor(s) (CPU), one or more Graphics Processing Unit(s) (GPU or general purpose GPU—GPGPU), a chip or any suitable computing or computational device, an operating system 171, a memory 172, a storage 175, input devices 176 and output devices 177. Airway management training systems 100 and virtual reality systems 150 may be or include a computer system as shown for example in FIG. 7.

Operating system 171 may be or may include any code segment designed and/or configured to perform tasks involving coordination, scheduling, arbitration, supervising, controlling or otherwise managing operation of computing device 154, for example, scheduling execution of programs. Memory 172 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 172 may be or may include a plurality of, possibly different memory units. Memory 172 may store for example, instructions to carry out a method (e.g., code 174), and/or data such as user responses, interruptions, etc.

Executable code 174 may be any executable code, e.g., an application, a program, a process, task or script. Executable code 174 may be executed by controller 173 possibly under control of operating system 171. For example, executable code 174 may when executed cause the production or compilation of computer code, or application execution such as VR execution or inference, according to embodiments of the present invention. Executable code 174 may be code produced by methods described herein. For the various modules and functions described herein, one or more computing devices 154 or components of computing device 154 may be used. Devices that include components similar or different to those included in computing device 154 may be used, and may be connected to a network and used as a system. One or more processor(s) 173 may be configured to carry out embodiments of the present invention by for example executing software or code.

Storage 175 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, VR model data, parameters, etc. may be stored in a storage 175 and may be loaded from storage 175 into a memory 172 where it may be processed by controller 173. In some embodiments, some of the components shown in FIG. 7 may be omitted.

Input devices 176 may be or may include for example a mouse, a keyboard, a touch screen or pad or any suitable input device. It will be recognized that any suitable number of input devices may be operatively connected to computing device 154 as shown by block 176. Output devices 177 may include one or more displays, speakers and/or any other suitable output devices. It will be recognized that any suitable number of output devices may be operatively connected to computing device 154 as shown by block 177. Any applicable input/output (I/O) devices may be connected to computing device 154, for example, a wired or wireless network interface card (NIC), a modem, printer or facsimile machine, a universal serial bus (USB) device or external hard drive may be included in input devices 176 and/or output devices 177.

Embodiments of the invention may include one or more article(s) (e.g., memory 172 or storage 175) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it, is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. An airway management training system comprising:
   a physical patient model having a respiratory tract, a head that is movable from side to side and an openable jaw,
   at least one airway management tool comprising a manual resuscitator with the at least one pressure sensor and at least one flexibility sensor on at least a part of a circumference thereof,
   a plurality of electromagnetic sensors configured to measure relative positions of the head and the jaw and relative positions of the at least one airway management tool with respect to the respiratory tract, and
   a virtual reality (VR) system configured to provide a trainee with a VR representation of a scene, of at least a patient corresponding to the physical patient model, of the at least one airway management tool and of hands of the trainee that handle the at least one airway management tool, wherein the VR system is configured to represent a hand of the trainee to correspond with detected pressure or flexing applied on the circumference of the manual resuscitator.

2. The airway management training system of claim 1, wherein:
   the virtual reality system comprises optical sensors configured to track at least a location of the physical patient model, a position and orientation of the at least one airway management tool and the hands of the trainee, and
   the virtual reality system is configured to dynamically identify a treatment situation performed by the trainee and to dynamically manage a situation-related hierarchy among the optical sensors that keep the VR representation of the scene continuous and coherent with respect to the identified treatment situation.

3. The airway management training system of claim 1, wherein the VR representation of the scene relates a visual representation of the at least one airway management tool to the respiratory tract.

4. The airway management training system of claim 1, wherein the VR representation of the scene indicates pressures applied by the at least one airway management tool on the respiratory tract.

5. The airway management training system of claim 1, wherein the at least one airway management tool comprises a laryngoscope with the at least one pressure sensor being on a blade of the laryngoscope.

6. The airway management training system of claim 1, wherein the at least one airway management tool comprises a multipurpose tool that is visually represented as at least one of: a scalpel, forceps, a tube, an ET (endotracheal) tube, suction, stethoscope, capnometer and oximeter.

7. An airway management training method comprising:
   training airway management within a virtual reality (VR) environment,
   using a physical patient model and at least one airway management tool to enhance the VR environment, wherein the physical patient model has a respiratory tract, a head that is movable from side to side and an openable jaw, and the at least one airway management tool has at least one pressure sensor,
   measuring relative positions of the head and the jaw and relative positions of the at least one airway management tool with respect to the respiratory tract, using a plurality of electromagnetic sensors associated with the passive patient model, and
   displaying to a trainee, in the VR environment, a scene, a patient corresponding to the physical patient model, the at least one airway management tool and hands of the trainee,
   wherein the at least one airway management tool comprises a manual resuscitator with the at least one pressure sensor and at least one flexibility sensor on at least a part of a circumference thereof, and the method further comprises providing VR feedback to the trainee with respect to measurements of pressures applied by the trainee onto the manual resuscitator and a degree of air-tightness between the manual resuscitator and a mouth of the passive patient model, and
   wherein the airway management training method further comprises representing a hand of the trainee to correspond with detected pressure or flexing applied on the circumference of the manual resuscitator.

8. The airway management training method of claim 7, comprising tracking at least a location of the physical patient model, the at least one airway management tool and the hands of the trainee.

9. The airway management training method of claim 7, comprising dynamically identifying a treatment situation performed by the trainee and dynamically managing a situation-related hierarchy among the sensors that keeps the VR representation continuous and coherent with respect to the identified treatment situation.

10. The airway management training method of claim 7, wherein the at least one airway management tool comprises a laryngoscope with the at least one pressure sensor being on a blade thereof, and the method further comprises providing VR feedback to the trainee with respect to measurements of pressures applied by the blade of the laryngoscope onto the respiratory tract.

11. The airway management training method of claim 7, comprising visually representing a multipurpose tool as the at least one airway management tool, in an adjustable manner as at least one of: a scalpel, forceps, a tube, an ET (endotracheal) tube, suction, stethoscope, capnometer and oximeter.

\* \* \* \* \*